(12) United States Patent
Beffa et al.

(10) Patent No.: US 11,681,303 B2
(45) Date of Patent: Jun. 20, 2023

(54) METHODS AND SYSTEMS FOR ESTIMATING THE ORIENTATION OF AN OBJECT

(71) Applicant: Verity AG, Zurich (CH)

(72) Inventors: Luciano Beffa, Zurich (CH); Markus Hehn, Zurich (CH)

(73) Assignee: Verity AG, Zurich (CH)

( * ) Notice: Subject to any disclaimer, the term of this patent is extended or adjusted under 35 U.S.C. 154(b) by 39 days.

(21) Appl. No.: 17/258,134

(22) PCT Filed: Jul. 8, 2019

(86) PCT No.: PCT/IB2019/000846
§ 371 (c)(1),
(2) Date: Jan. 5, 2021

(87) PCT Pub. No.: WO2020/030966
PCT Pub. Date: Feb. 13, 2020

(65) Prior Publication Data
US 2021/0278864 A1    Sep. 9, 2021

Related U.S. Application Data

(60) Provisional application No. 62/694,876, filed on Jul. 6, 2018.

(51) Int. Cl.
*G05D 1/10* (2006.01)
*G01C 21/16* (2006.01)
(Continued)

(52) U.S. Cl.
CPC .......... *G05D 1/106* (2019.05); *G01C 21/165* (2013.01); *G01C 21/18* (2013.01); *G01C 22/00* (2013.01);
(Continued)

(58) Field of Classification Search
CPC ...... G05D 1/106; G01C 21/165; G01C 21/18; B64C 39/024; B64C 2201/141
See application file for complete search history.

(56) References Cited

U.S. PATENT DOCUMENTS 7,715,619 B2 *   5/2010   Hamanaka .............. G06T 15/20
                                                                    382/118
2009/0177320 A1 *  7/2009   Lee ...................... G05D 1/0225
                                                                      901/1
(Continued)

FOREIGN PATENT DOCUMENTS

WO    WO-2019015761 A1 *  1/2019   .......... G06K 9/6214

OTHER PUBLICATIONS

International Search Report and Written Opinion of PCT/IB2019/000846 dated Dec. 16, 2019.
(Continued)

*Primary Examiner* — Anshul Sood
*Assistant Examiner* — Matthew Ho
(74) *Attorney, Agent, or Firm* — Haley Guiliano LLP

(57) ABSTRACT

The system receives position information in both an internal coordinate frame and an external coordinate frame. The system uses a comparison of position information in these frames to determine orientation information. The system determines one or more orientation hypotheses, and analyzes the position information based on these hypotheses. The system may include on-board accelerometers, gyroscopes, or both that provide the measurements in the internal coordinate frame. These measurements may be integrated or otherwise processed to determine position, velocity, or both. Measurements in the external frame are provided by GPS sensors or other positioning systems. Position information is transformed to a common coordinate frame, and an error metric is determined. Based on the error metric, the system estimates a likelihood metric for each hypothesis, and determines a resulting hypothesis based on the maximum likelihood or a combination of likelihoods.

29 Claims, 7 Drawing Sheets

(51) Int. Cl.
  *G01C 21/18* (2006.01)
  *G01C 22/00* (2006.01)
  *B64C 39/02* (2023.01)
(52) U.S. Cl.
  CPC ........ *B64C 39/024* (2013.01); *B64U 2201/10* (2023.01)

(56) References Cited

U.S. PATENT DOCUMENTS

| | | | |
|---|---|---|---|
| 2016/0076892 A1* | 3/2016 | Zhou | B64D 47/08 701/3 |
| 2017/0074678 A1* | 3/2017 | Lo | G01C 21/165 |
| 2017/0097232 A1* | 4/2017 | Anderson-Sprecher | B25J 9/1697 |
| 2020/0386555 A1* | 12/2020 | Schroeter | G01S 7/003 |

OTHER PUBLICATIONS

Robert Harle: "Sensor Fusion Techniques", Mar. 25, 2018 (Mar. 25, 2018), XP055648165, Retrieved from the Internet: URL:https://web.archive.org/web20180325105141if_/http://www.cl.cam.ac.uk:80/teaching/17187/MobSensSys/mobile-9.pdf [retrieved on Dec. 2, 2019].

Gerasimos G Rigatos: "Technical Analysis and Implementation Cost Assessment of Sigma-Point Kalman Filtering and Particle Filtering in Autonomous Navigation Systems", 2010 IEEE Vehicular Technology Conference (VTC 2010—Spring) May 16-19, 2010—Taipei, Taiwan, IEEE, US, May 16, 2010 (May 16, 2010), pp. 1-5.

Roi Yozevitch et al: "Advanced Particle Filter Methods" In: "Heuristics and Hyper-Heuristics—Principles and Applications", Aug. 30, 2017, In Tech, XP055648201.

David Tornqvist et al.: "Particle Filter SLAM with High Dimensional Vehicle Model", Journal Of Intelligent And Robotic Systems; Theory And Applications—(Incorporating Mechatronic Systems Engineering), Kluwer Academic Publishers, DO, vol. 55, No. 4-5, Jan. 21, 2009 (Jan. 21, 2009), pp. 249-266, XP019679197.

Valls Miguel I et al.: "Design of an Autonomous Racecar: Perception, State Estimation and System Integration", 2018 IEEE International Conference On Robotics And Automation (ICRA), IEEE, May 21, 2018 (May 21, 2018), pp. 2048-2055, XP033403688.

James Pinchin et al., "A Particle filter Approach to Indoor Navigation Using a Foot Mounted Inertial Navigation System and Heuristic Heading Information," 2012 International Conference on Indoor Positioning and Indoor Navigation, Nov. 13-15, 2012, pp. 1-10, XP032313222.

* cited by examiner

METHODS AND SYSTEMS FOR ESTIMATING THE ORIENTATION OF AN OBJECT

CROSS-REFERENCE TO RELATED APPLICATIONS

The present disclosure relates to determining orientation information of an object, and more particularly to determining orientation information of an object based on hypotheses. This application is a United States National Phase Application filed under 35 U.S.C. § 371 from International Patent Application No. PCT/IB2019/000846, filed on Jul. 8, 2019, which claims the benefit of U.S. Provisional Patent Application No. 62/694,876, filed on Jul. 6, 2018, the disclosures of which are hereby incorporated by reference herein in their entireties.

BACKGROUND

For an autonomous robot to fly in a controlled way, the robot may need to know its position and orientation. When a robot is equipped with accelerometers and gyroscopes, its orientation may be difficult to determine solely from the accelerometer and gyroscope measurements. The robot may be unable to relate measurements gathered by the accelerometer and the gyroscope (where measurements are expressed in a known internal coordinate frame) with the measurements obtained from an external localization system (where measurements are expressed in a known external coordinate frame). In some circumstances, an autonomous robot may start to follow a path in a particular orientation, but may be placed incorrectly and thus have the wrong bearing or other orientation. An incorrect initial assumption of orientation can cause a crash or cause the vehicle to become uncontrollable.

The present solutions to solve this issue create myriad problems. One such solution involves using sensor measurements related to the orientation of the vehicle, such as the sensor measurements obtained from magnetometers, to determine the orientation of a robot. However, many of these sensors are susceptible to external disturbances or noise and thereby communicate incorrect data. For instance, the magnetometer may be disturbed by magnetic fields caused by current flowing nearby such as power lines or large metal objects and/or magnets. The magnetometers can also add additional weight and cost to the robot. Therefore, to overcome the aforementioned disadvantages, in some embodiments, solutions are needed that can determine the orientation of an object by estimating it instead of directly sensing said orientation.

SUMMARY

In accordance with the present disclosure, limitations of current systems for localizing have been reduced or eliminated. The present disclosure fuses measurements from two sources by applying multiple hypotheses. The first source may be any suitable sensing method providing measurements informative about the motion of the object with respect to a known coordinate frame that is typically fixed to the object (hereinafter referred as the internal coordinate frame). The second source may be any suitable sensing method providing measurements informative about the motion of the object with respect to a different known coordinate frame that is typically fixed to the space within which the object moves (hereinafter referred as the external coordinate frame). A hypothesis includes a belief of the orientation of the internal coordinate frame with respect to the external coordinate frame.

For every hypothesis, a state estimator estimating the vehicle state can be implemented using any suitable means of estimating the vehicle state such as Kalman Filter, extended Kalman filter, Nonlinear observer, Luenberger observer, Sliding mode observer, etc. A vehicle state includes at least any of an orientation, position, and/or velocity, or any other combinations thereof. Next, the likelihood/probability of every hypothesis is computed. In one instance, to control an autonomous robot, the estimate of the most likely estimator, i.e. the estimator with the highest likelihood may be used. Finally, to save computational resources, updating the state estimate for all hypotheses may be aborted once one of the hypotheses is considerably more likely than all others. This may for example be done using a threshold on the likelihoods or requiring that one hypothesis must be at least a predefined factor $\eta$ larger than any other hypothesis.

BRIEF DESCRIPTION OF THE DRAWINGS

Embodiments of the present disclosure are illustrated by way of example and not limitation in the figures of the accompanying drawings, in which like references indicate similar elements and in which.

DETAILED DESCRIPTION

The present disclosure is directed to systems and methods for determining, verifying, or both, an orientation of an object. For example, a robot capable of hovering or flight may be able to navigate three translational degrees of freedom and three rotational degrees of freedom. Position sensors and motion sensors, in some circumstances, are not configured to directly provide orientation information. In the absence of an orientation sensor (e.g., a magnetometer or compass), the orientation may be inferred, assumed, estimated or otherwise determined. In some embodiments, the orientation of the vehicle is determined when a sensor failure occurs. If, for example, a vehicle is equipped with a magnetometer used to determine its orientation, and said magnetometer fails and/or is disturbed, the method described herein can be used instead of the magnetometer to determine the orientation. In some embodiments, the system monitors the estimated orientation of an object and detects whether the estimated orientation is unlikely or likely to be true. For example, the system can detect orientation sensor malfunctions or an improper initialization. Further description regarding localization systems is provided in U.S. Pat. No. 10,302,737, which is hereby incorporated by reference herein in its entirety.

Figure 1:
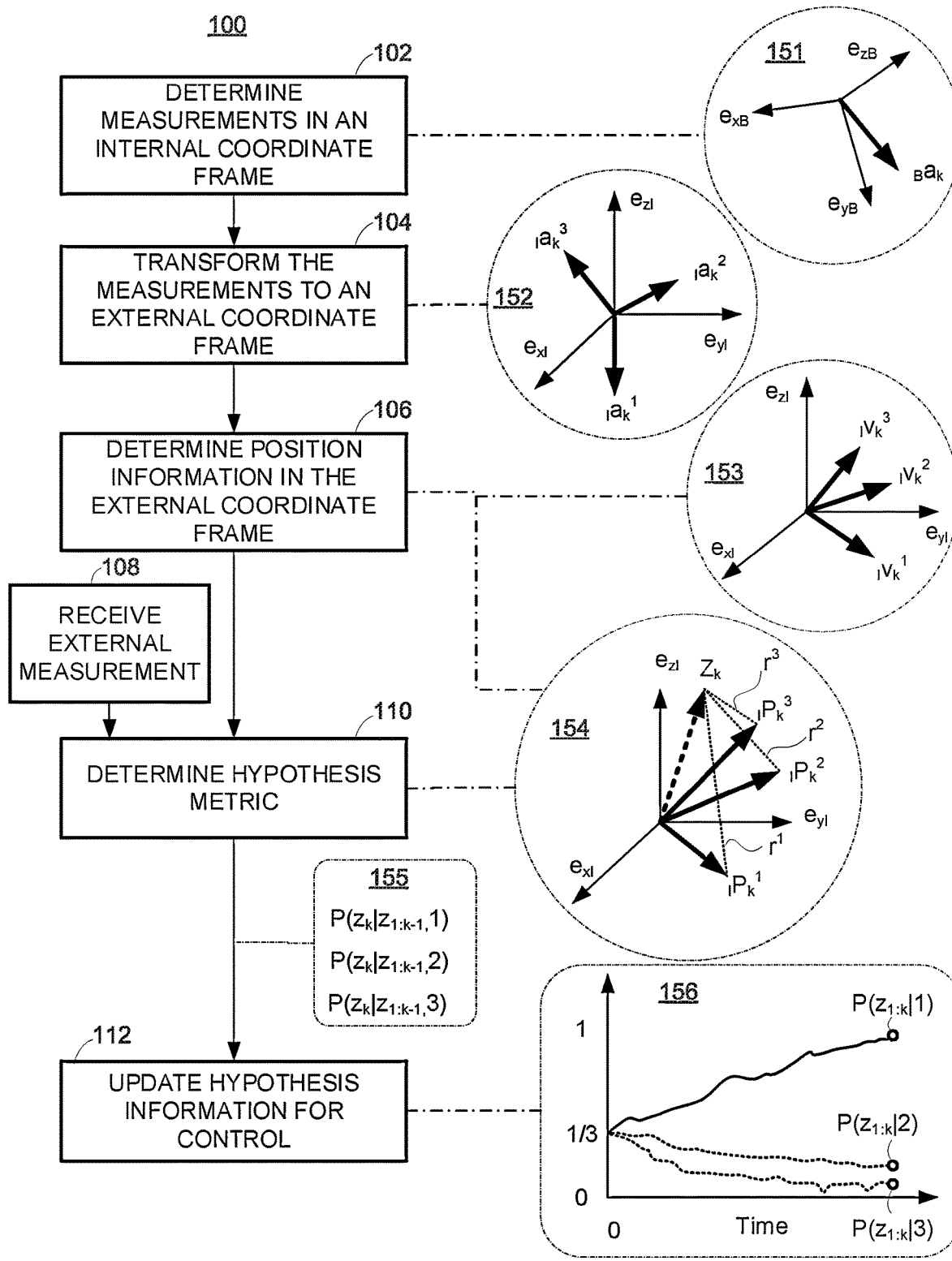
FIG. 1 is an illustration of a multi-hypothesis process, in accordance with some embodiments of the present disclosure.

FIG. 1 is an illustration of a multi-hypotheses process 100, which includes a multi-hypotheses location update process, in accordance with some embodiments of the present disclosure. For example, process 100 may be performed by control circuitry or an illustrative localization unit thereof. Although process 100 describes steps utilizing three (N=3) hypotheses, any suitable number of hypotheses (e.g., one, more than one, more than three) may be included in accordance with the present disclosure. Vectors, measurements, or otherwise quantities expressed in the internal coordinate frame will hereafter be written with a subscript B and vectors, measurements, or otherwise quantities expressed in the external coordinate frame will hereafter be written with a subscript I. Vectors, measurements, or otherwise quantities referring to a specific time k will hereafter be written with a subscript k. Vectors, measurements, or otherwise quantities are expressed in a common coordinate frame if the respective vectors, measurements, or otherwise quantities are expressed in the same coordinate frame. For example, the common coordinate frame could be the internal or the external coordinate frame. The illustrative techniques of process 100 may be applied to, for example, mobile robot 200 of FIG. 2.

At step 102, the control circuitry determines measurements in an internal coordinate frame. In some embodiments, measurement in the internal coordinate frame are performed by an Inertial Measurement Unit (IMU), which may include at least an accelerometer and a gyroscope. Accelerometers, gyroscopes, or both, may perform measurements about one or more axes. For example, as illustrated in panel 151, there are three orthogonal vectors $e_{xB}$, $e_{yB}$, and $e_{zB}$ specifying the internal coordinate frame, and an accelerometer measurement $_Ba_k$ expressed in the internal coordinate frame. Measurements in the internal coordinate frame are based on one or more sensors that may be fixed to the robot, and accordingly perform measurements relative to the robot. As referred to herein, control circuitry can mean circuitry based on one or more microprocessors, microcontrollers, digital signal processors, programmable logic devices, field-programmable gate arrays (FPGAs), application-specific integrated circuits (ASICs), etc., and may include a multi-core processor (e g, dual-core, quad-core, hexa-core, or any suitable number of cores) or supercomputer. In some embodiments, control circuitry may be distributed across multiple separate processors or processing units, for example, multiple of the same type of processing units or multiple different processors. In some embodiments, control circuitry executes instructions for an application stored in memory. Control circuitry may be instructed by the application to perform the functions discussed above and below. In an illustrative example, a control application may be implemented on control circuitry. In a further example, an evaluation unit or localization unit may include any suitable hardware (such as control circuitry), software, or combination thereof.

At step 104, the control circuitry transforms the accelerometer measurement $_Ba_k$ to an external coordinate frame. In order to transform quantities from the internal coordinate frame to the external coordinate frame, the orientation of the robot relative to the external coordinate system must be specified. In some circumstances, however, that information must be solved for. One or more hypotheses of orientation are used to perform the transform. For example, as illustrated in panel 152, three acceleration measurements are shown, corresponding to the respective hypotheses. In some embodiments, the external coordinate frame is specified by the orthogonal vectors $e_{x1}$, $e_{y1}$, and $e_{z1}$ as illustrated in panel 152. The transformation may be performed for all hypotheses i (e.g., i is an index among N hypotheses, of which there are three in the illustrated example) using the corresponding estimated orientation $R^i$ according to the equation $$_Ia_k^i = R^i_B a_k$$

resulting in the three vectors $_Ia_k^1$, $_Ia_k^2$, and $_Ia_k^3$. Said three vectors represent the measured acceleration of the object according to the three hypotheses expressed in the external coordinate frame. Note that the true orientation of the internal coordinate frame with respect to the external coordinate frame may be unknown (e.g., and is to be estimated). The three vectors $_Ia_k^1$, $_Ia_k^2$, and $_Ia_k^3$ are based on different hypotheses, and in some circumstances, it may be unclear which of the three transformations of the measured accelerations is the true acceleration, or the closest to the true acceleration of the object. For example, if a first hypothesis were more accurate than a second hypothesis, the acceleration determined based on the first hypothesis is expected to be more accurate. In some embodiments, process 100 provides a technique to evaluate hypotheses to determine which, if any, are most accurate.

At step 106, the control circuitry determines position information in the external coordinate frame. In some embodiments, the control circuitry integrates the acceleration vectors $_Ia_k^1$, $_Ia_k^2$, and $_Ia_k^3$ in time to determine the corresponding velocity vectors $_Iv_k^1$, $_Iv_k^2$, and $_Iv_k^3$. For example, the control circuitry may determine the velocity vectors according to the following equation $$_Iv_k^i = {_Iv_{k-1}^i} + {_Ia_k^i} \Delta T$$

where $\Delta T$ is the known sampling/update frequency of the implemented process. Panel 153 illustrates velocity vectors corresponding to the three acceleration vectors, in the external coordinate frame.

At step 106, the control circuitry integrates velocity vectors $_Iv_k^1$, $_Iv_k^2$, and $_Iv_k^3$ in time to determine corresponding position vectors $_Ip_k^1$, $_Ip_k^2$, and $_Ip_k^3$. For example, the control circuitry may determine the position vectors according to the following equation $$_Ip_k^i = {_Ip_{k-1}^i} + {_Iv_k^i} \Delta T$$

where $\Delta T$ is the known sampling/update frequency of the implemented process. In some circumstances, a position measurement $z_k$ in the external coordinate frame (e.g., shown as a dashed vector) is available (e g, by means of a GPS receiver or any other suitable means of localization). Panel 154 illustrates position vectors corresponding to the three velocity vectors, in the external coordinate frame.

At step 108, the control circuitry receives an external measurement of position (i.e., a position measurement). If position measurement $z_k$ in the external coordinate frame is available (e.g., received at step 108), the control circuitry may proceed to step 110 to determine a hypotheses metric. For example, the availability of position measurement $z_k$ allows the position vectors to be evaluated to determine which hypotheses is likely to be more accurate. In some embodiments, the external measurement may include data from a GPS system, imaging system, any other suitable position system, or any combination thereof.

In some embodiments, at step 110 the control circuitry may determine relative position error between the position vectors $_Ip_k^1$, $_Ip_k^2$, and $_Ip_k^3$ and position measurement $z_k$ for every hypothesis i according to the following equation $$r^i = z_k - _Ip_k^i.$$

The control circuitry may infer the likelihood of the measurement $z_k$ given the hypothesis i based on error $r^i$. For example, a large error $r^i$ indicates that a hypothesis is unlikely, while a small error $r^i$ indicates that a hypothesis is likely. In some embodiments, the control circuitry may filter, average, limit (e.g., saturate), rate limit, or otherwise modify the error to generate a modified error. The control circuitry may determine any suitable position error metric based on a position measurement and position information. Panel 154 illustrates errors $r^i$ corresponding to the three position vectors and the position measurement, in the external coordinate frame.

At step 110, the control circuitry determines a hypotheses metric for each hypothesis, or a subset of hypotheses thereof. In some embodiments, the control circuitry determines a measurement likelihood for every hypothesis i (e.g., of N hypotheses). For example, the measurement likelihood (e.g., as shown in panel 155) may be defined as a probability of hypothesis i obtaining a measurement value $z_k$ given measurement history $z_{1:k-1} = [z_1, z_2, \ldots, z_{k-1}]$, and may be represented as $$p(z_k | z_{1:k-1}, i).$$

The specific value may be determined from a known probability density function, a predetermined probability density function, a modeled probability density function, or a combination thereof, associated to the position measurement uncertainty (e.g., GPS measurement noise).

At step 112, the control circuitry updates hypotheses information for purposes of control. In some embodiments, the control circuitry updates, by recursion, the likelihood of each hypothesis according to the following equation $$\tilde{p}(z_{1:k} | i) = p(z_k | z_{1:k-1}, i) p(z_{1:k-1} | i).$$

In some embodiments, the control circuitry rescales (e.g., normalizes) these probability values such that the sum of all hypothesis likelihoods adds up to one $$p(z_{1:k} | i) = \frac{\tilde{p}(z_{1:k} | i)}{\sum_{i=1}^{N} \tilde{p}(z_{1:k} | i)}.$$

Panel 156 illustrates hypothesis likelihoods over time. In some embodiments, an object is equipped with a 3-axis accelerometer and a 3-axis gyroscope. The accelerometer provides measurements of the acceleration of the object expressed in the internal coordinate frame. The gyroscope provides measurements of the rotational velocity of the object expressed in the internal coordinate frame. In some embodiments, the object is equipped with a GPS receiver that provides measurements of the position of the object in an external frame (e.g., position measurement $z_k$).

The control circuitry may include any suitable number of hypotheses in determining hypotheses metrics and information. The number of hypotheses is a design parameter that may depend on the specific sensor configuration and quality of the signals (e.g., as characterized by a signal to noise ratio, update frequency, or any other parameter). In some embodiments, two or more hypotheses are used. In an illustrative example, there may be four hypotheses corresponding to the orientations north, east, south, and west (e.g., the bearing of the object). The control circuitry would accordingly determine four sets of position information based on the respective hypotheses, and four respective hypotheses metrics (e.g., based in part on a position measurement). In some embodiments, the control circuitry updates four respective likelihoods. After at least one iteration (e g, at least one performance of steps 102-110 of process 100), the control circuitry may select a most appropriate hypothesis (e.g., the maximum likelihood, such as "north"), determine a resultant orientation (e.g., based on a weighted sum or combination of the likelihoods, such as "northwest"), determine a least probably likelihood (e.g., to omit from further consideration or analysis), determine a new set of hypotheses (e.g., having a higher resolution, or a reduced variation to more precisely estimate the orientation), determine a likely fault (e.g., a faulted sensor, transceiver, or signal), or a combination thereof.

In some embodiments, the control circuitry determines the state of the object as $x = (_Ip, _Iv, R)$ consisting of position $_Ip$, velocity $_Iv$, and orientation R. The orientation R includes, for example, a rotation matrix that relates the internal coordinate frame B with the external coordinate frame I as follows $$_I\xi = R_B \xi$$

where $\xi$ is an arbitrary vector.

In an illustrative example, the state x may be estimated using an extended Kalman filter. Then, as described above, each hypothesis estimates the state by means of an extended Kalman filter. The hypothesis will hereafter be numbered with an index $i \in 1, \ldots, N$. Each extended Kalman filter (EKF) is initialized with a different initial orientation (e.g., based on the respective hypothesis). Each EKF thus has a different estimated orientation $R^i$, and every EKF may have an associated likelihood of 1/N, where N is the number of hypotheses. The associated likelihood of a hypotheses does need not be 1/N and may be chosen arbitrarily or based on any suitable criteria depending on the specific problem.

Each EKF estimates the state as described below. In the prior update step each EKF determines a mean $x_{k|k-1}^i$ and covariance matrix $P_{k|k-1}^i$. For example, the accelerometer measurement can be rotated to the external coordinate frame, and then numerically integrated over time to obtain the velocity $_Iv$ expressed in the external coordinate frame. The control circuitry may then numerically integrate the velocity over time to obtain the position $_Ip$ expressed in the external coordinate frame. In another embodiment, a model of how the state x evolves from time k−1 to time k may be used to determine $x_{k|k-1}^i$ and $P_{k|k-1}^i$.

After reception of a position measurement $z_k$ from the GPS receiver, or a localization system, at time instant k, the estimated state of each EKF can be updated according to the posterior update EKF equations.

In some embodiments it is assumed that the position measurement $z_k$ can be modelled as $$\hat{z}_k = H_k x_k + \epsilon_k$$

where $H_k$ is the matrix that relates the state $x_k$ to the position measurement $z_k$ at time k, and $\epsilon_k$ is normally-distributed additive noise with mean zero and covariance matrix $R_k$. In some embodiments the matrix $H_k$ is different for each of the hypotheses. In some embodiments $H_k$ is a linearization of a nonlinear measurement model $\hat{z}_k = h(x_k, \epsilon_k)$ around $x_k = x_{k|k-1}$.

The likelihood that an EKF obtains the position measurement $z_k$ given the measurement history $z_{1:k-1}=[z_1, z_2, \ldots, z_{k-1}]$ is normally distributed with known mean and covariance and the probability is $$p(z_k|z_{1:k-1}, i) = \frac{1}{\sqrt{(2\pi)^3 |W_k^i|}} \exp\left(-\frac{1}{2}(r_k^i)^T (w_k^i)^{-1} r_k^i\right)$$

where $|W_k^i|$ is the matrix determinant of the innovation covariance $W_k^i$ and $r_k^i = z_k - H_k x_{k|k-1}^i$, wherein the innovation covariance is given as $$W_k^i = H_k P_{k|k-1}^i H_k^T + R_k$$

The likelihood of each hypothesis is then updated by recursion over time according to $$\tilde{p}(z_{1:k}|i) = p(z_k|z_{1:k-1}, i) p(z_{1:k-1}|i)$$

and rescaled such that the sum of all hypothesis likelihoods adds up to one, as shown by the following equation $$p(z_{1:k}|i) = \frac{\tilde{p}(z_{1:k}|i)}{\sum_{i=1}^{N} \tilde{p}(z_{1:k}|i)}.$$

In some embodiments, the control circuitry aborts updating the state estimate for all hypotheses according to one or more criteria. For each hypothesis i, for example, the estimated direction of the x-axis of the internal frame, expressed in the external frame is computed as $$\hat{e}_{x,B}^i = R^i (1,0,0)^T.$$

Then a convergence criterion at time instant k may be computed as follows $$S_k = 1 - \left\| \sum_{i=1}^{N} p(z_{1:k}|i) \hat{e}_{x,B}^i \right\|,$$

If said convergence criterion is below a predefined threshold, then the state estimate of only the most likely EKF (e.g., the EKF with the highest value for $p(z_{1:k}|i)$) is updated, and the other EKFs are no longer updated. In some embodiments, the memory associated to the other (e.g., not selected) hypotheses may also be freed.

An evaluation unit implementing process 100 may include any suitable hardware and software (e.g., including control circuitry and applications implemented thereon). In some embodiments, the evaluation unit receives data from the sensors and computes the likelihood of one or more hypotheses by comparing the received data from two or more sensors. The evaluation unit determines a most appropriate orientation hypothesis based on the calculated likelihood of the hypotheses and allows the robot to estimate its location. Process 100 is merely illustrative and various modifications can be made, including for example, transforming from an external coordinate frame to an internal coordinate frame.

In some embodiments, the most appropriate orientation hypothesis is the orientation hypothesis with the largest hypothesis likelihood. In some embodiments the most appropriate orientation hypothesis is the weighted average of all orientation hypotheses, wherein the weight is proportional to the respective hypothesis likelihood.

Figure 2:
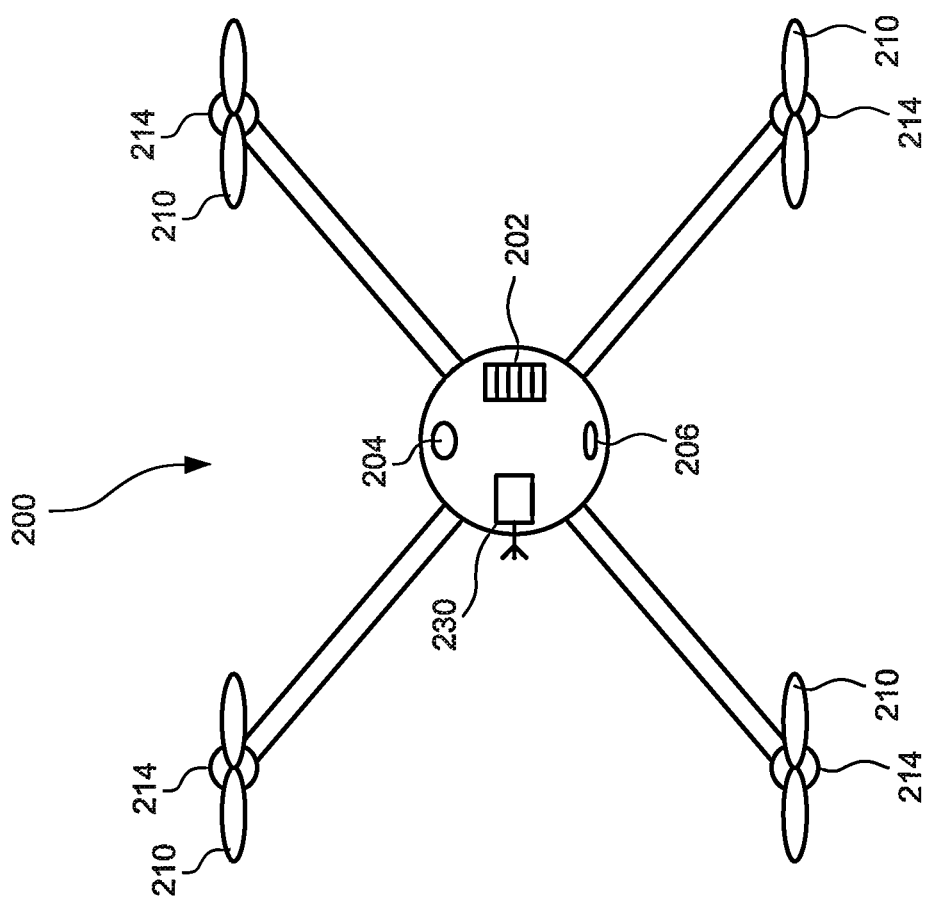
FIG. 2 shows an illustrative mobile robot that includes a self-localizing apparatus in accordance with some embodiments of the present disclosure.

FIG. 2 shows an illustrative mobile robot 200 that includes self-localizing apparatus 230 in accordance with some embodiments of the present disclosure. Mobile robot 200 may also include one or more sensors, coupled to control circuitry (e.g., which may include central processing electronics). In some embodiments, mobile robot 200 includes an accelerometer 206 and a gyroscope 204. In some embodiments, mobile robot 200 additionally includes one or more of magnetometers, barometers, a GPS receiver, and proprioceptive sensors (e.g., sensors to monitor battery level and motor currents). Mobile robot 200 as illustrated also includes actuators 214 (e.g., four motors) that are used to rotate four propellers 210 that allow the mobile robot to stay airborne and to control its movement through the space. In some embodiment, actuators 214 are powered by a battery. In some embodiments, transceivers or apparatuses are powered by batteries.

Figure 3:
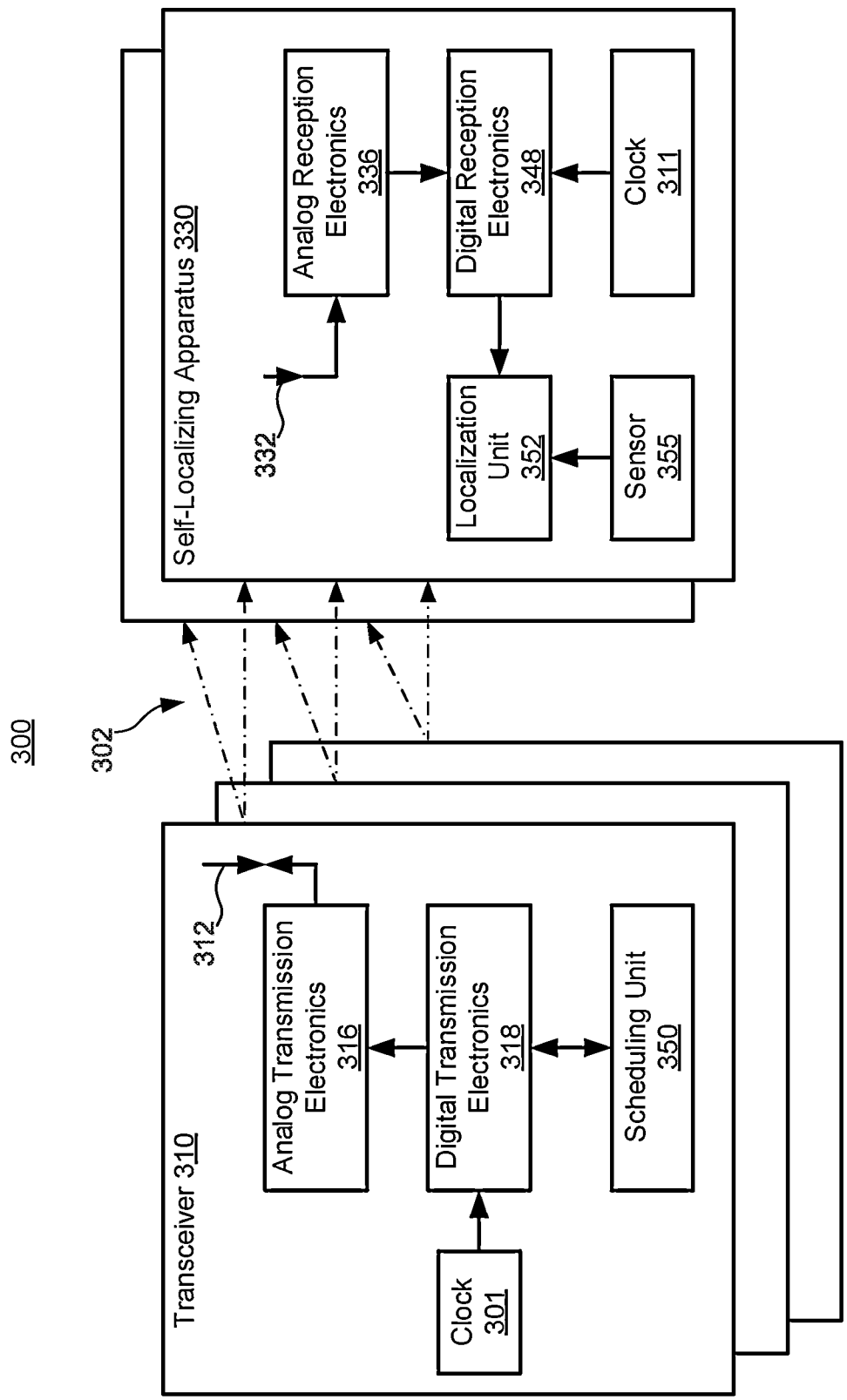
FIG. 3 is a block diagram of an illustrative localization system, in accordance with some embodiments of the present disclosure.

Self-localizing apparatus 230 of FIG. 2 (e.g., similar to or the same as self-localizing apparatus 330 of FIG. 3) may be integrated with control circuitry of mobile robot 200. For example, apparatus 230 may have access to one or more sensors of mobile robot 200 (e.g., accelerometer 206, and gyroscope 204). This may, for example, be useful or convenient to achieve a certain weight distribution on a flying robot, to allow for better antenna reception, or to co-locate related electronic components. Depending on the application, flight electronics may include more components than the embodiments described here and may include, for example, multiple electronic processing units, multiple antennas, or multiple self-localizing apparatuses.

Figure 4:
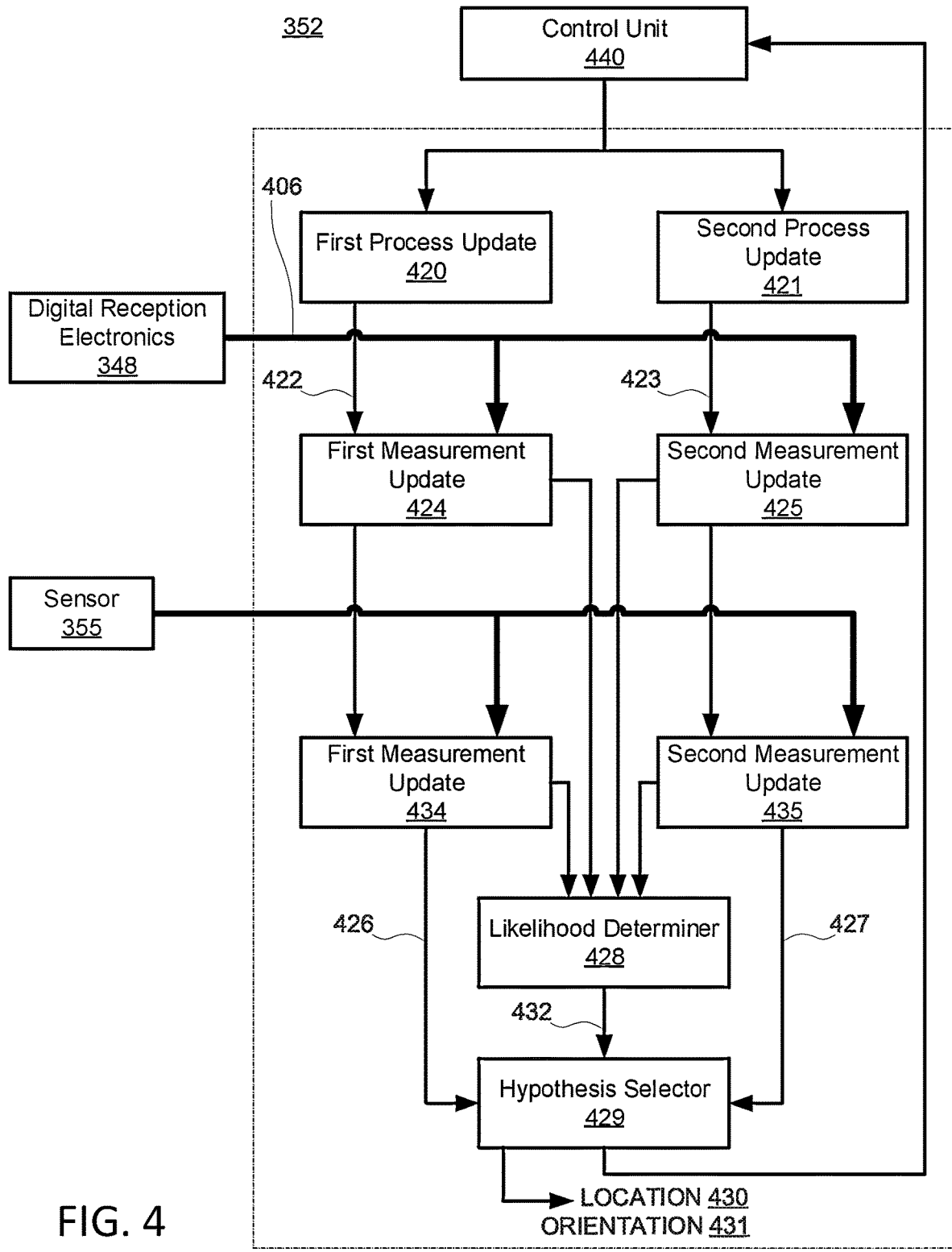
FIG. 4 is a block diagram of a portion of the illustrative system of FIG. 3, which includes a location and orientation update process, in accordance with some embodiments of the present disclosure.
Figure 5:
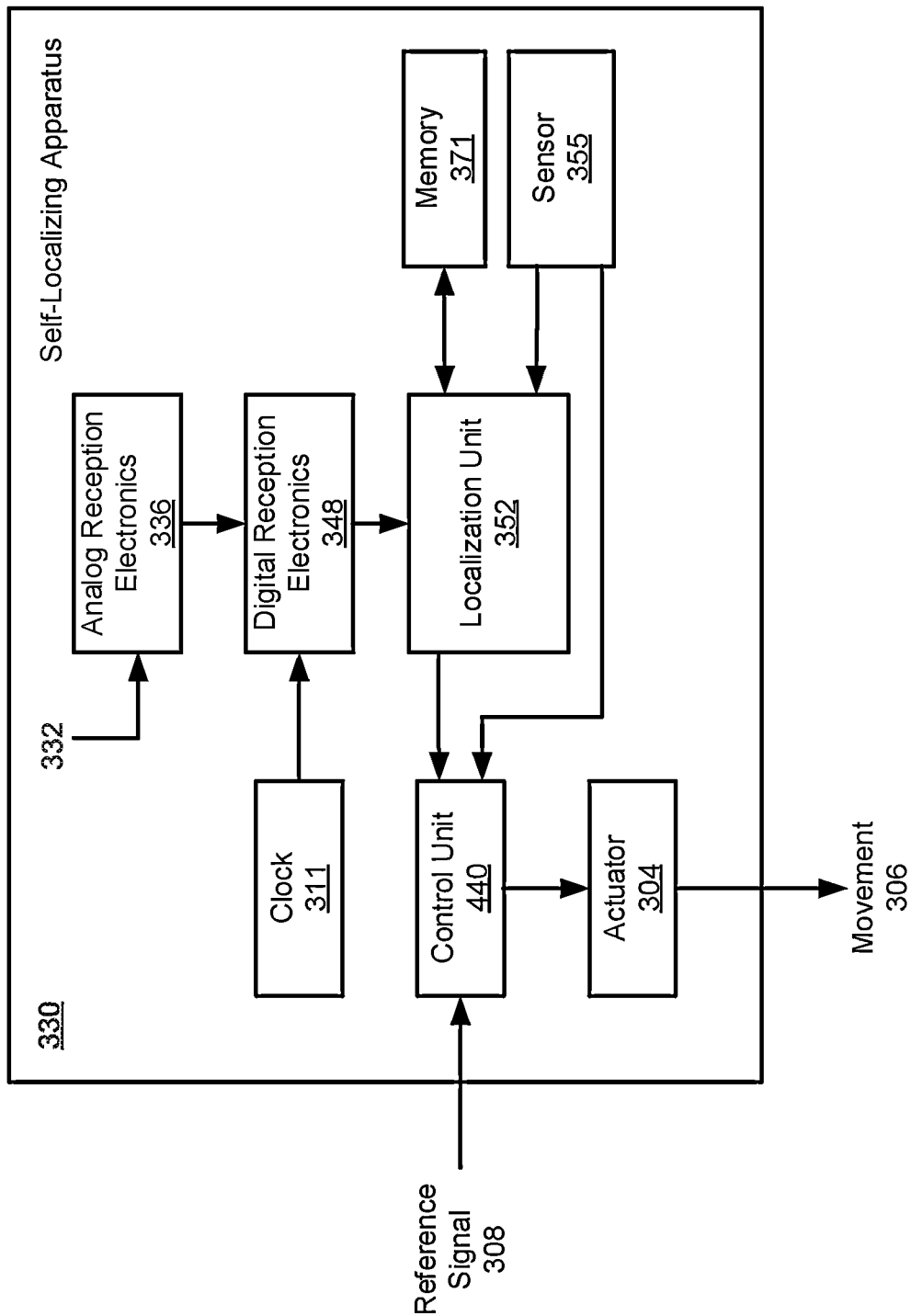
FIG. 5 is a block diagram of an illustrative self-localizing apparatus that is capable of actuation in accordance with some embodiments of the present disclosure.

FIGS. 3-5 shows illustrative systems for processing position information, and any other suitable information to operate a mobile robot. For example, illustrative process 100 may be implemented by the illustrative systems of FIGS. 3-5.

FIG. 3 shows a block diagram of an illustrative localization system 300 (sometimes referred to herein as a "network") that includes three time-synchronized timestampable signal transceivers 310 and two self-localizing apparatuses 330 that includes a location update process based on the multi-hypotheses method, in accordance with some embodiments of the present disclosure. Each of the three time-synchronized timestampable signal transceivers 310 transmit timestampable signals 302. In some embodiments, the three stationary time-synchronized timestampable signal transceivers 310 have known relative locations to each other. In some embodiments, the three time-synchronized timestampable signal transceivers 310 have synchronized clocks 301. Transceivers and transmitters are sometimes referred to herein as "anchors" or "beacons". It will be understood that while three time-synchronized timestampable signal transceivers and two self-localizing apparatuses are illustrated in FIG. 3, any suitable numbers of transmitters and self-localizing apparatuses may be used in localization system 300.

The two mobile self-localizing apparatuses 330 receive the timestampable signals 302. Each mobile self-localizing apparatus 330 may use signals 302 to compute its location relative to time-synchronized timestampable signal transceivers 310. In some embodiments, this is achieved by timestamping the signals 302, converting the timestamps to distances, and using these distances to compute the relative location. This conversion can use an estimation of the speed of the signals 302 in the transmission medium (e.g., the speed of light in air). This conversion may be accomplished in the localization unit 352. Localization unit 352 may compute the self-localizing apparatus' location relative to the known locations of time-synchronized timestampable signal transceivers 310 by trilateration or multilateration and said location may be used in the multi-hypothesis method described above. Sufficiently accurate timestamping may be provided by digital reception electronics 348 and a clock 311.

Each of the time-synchronized timestampable signal transceivers 310 in FIG. 3 comprises analog electronic components and digital electronic components. An antenna 312 is coupled to analog transmission electronics 316. Analog transmission electronics 316 may generate an analog transmission signal from at least one digital data packet. Digital data packets are provided by digital transmission electronics 318. The analog transmission signal can be generated using an analog pulse generator. The analog transmission signal may also be amplified by an amplifier before being passed to antenna 312 for transmission.

The transmission electronics 316, 318 are used to convert payload data (sometimes called "payload") into signals 302 that may then be transmitted by time-synchronized timestampable signal transceivers 310. Here, a timestampable signal 302 is used. A single timestampable signal 302 transmitted by a single time-synchronized timestampable signal transceivers 310 can be received by a plurality of apparatuses 130. Each apparatus may use information gained from multiple signals 302 to compute its location without emitting signals of its own.

Clock 301 is coupled to transmission electronics 316, 318 and provides timing information for transmitting timestampable signals 302. (lock 301 may include an onboard clock or may have a wireless or wired connection (not shown) that receives a time information from an offboard clock (not shown), e.g., at a remote location.

Analog transmission electronics 316 is coupled to digital transmission electronics 318 and together they allow the transmission of timestampable signals 302. Such transmissions may be performed such that the transmission of signal 302 from antenna 312 occurs accurately at a specified transmission time relative to clock 301. This can be achieved using digital transmission electronics 318. The transmission of a signal at a specified time is preferably performed such that a specific symbol is emitted from the antenna 312 at the specified time. For transmissions that follow the IEEE 802.15.4 standard, a common choice for the symbol to be transmitted at that time is the beginning of the start-of-frame delimiter, i.e., the point at which the transmitted signal changes from the repeated transmission of the preamble code to the transmission of the start-of-frame delimiter. Digital transmission electronics 318 may use the signal provided by the clock 300 as a reference in this transmission at said specified time; the transmission time can therefore be expressed relative to this clock.

The two self-localizing apparatuses 330 shown in FIG. 3 are each configured to receive the timestampable signals 302 transmitted by time-synchronized timestampable signal transceivers 310 through an antenna 332, analog reception electronics 336, and digital reception electronics 348. The reception electronics 336, 348 may accurately determine the reception times at which the transmitted signals reach the antenna 332. Determining a signal's reception time ("timestamping") may be carried out by determining the time at which a symbol is detected. For transmissions that follow the IEEE 802.15.4 standard, a common choice for the symbol to be timestamped is the beginning of the start-of-frame delimiter (i.e., the point at which the transmitted signal changes from the repeated transmission of a preamble code to the transmission of the start-of-frame delimiter).

Digital reception electronics 348 uses a signal provided by the apparatus' clock 311 as a reference in this timestamping process. The timestamp may be therefore expressed relative to this clock. In some embodiments, clock 311 comprises an onboard clock. Reception electronics 336, 348 may also provide additional metrics related to received signals 102. Received signals may be analyzed, conditioned, or characterized with respect to signal quality. In some embodiments, reception electronics 336, 348 may determine one or more quality metrics, indicative of received signal quality. Quality metrics may, for example, include signal strength, reception time standard deviation, or noise properties of the signal. Quality metrics may be computed based on absolute values (e.g., an absolute signal strength) or based on relative values (e.g., a difference of signal strengths). Quality metrics may also be computed by comparing signals. For example, quality metrics may be computed based on comparisons of a signal over time, on comparisons between signals from different transceivers, on comparisons of signals received from different directions, on comparisons of signals with thresholds, on comparisons of signals with their expected property, and others. Comparisons may use individual signal properties (e.g., the peak power) or entire signals (e.g., the signal's spectral shapes). Quality metrics may, for example, be used to determine whether a signal 102 travelled in line of sight, or what material it may have traversed, or how it may have been reflected.

Each self-localizing apparatus may also be equipped with one or more sensors 355. Typical examples of sensor data are those received from sensors, such as accelerometers, gyroscopes, magnetometers, cameras, optical flow sensors, laser or sonar range finders, radar, barometers, thermometers, hygrometers, bumpers, chemical sensors, electromagnetic sensors, air flow sensors, or microphones (none shown). Memory units (not shown) are typically used to store data. For example, they may be used to store data on past sensor readings, operational states or user commands.

The systems and methods of the present disclosure may include the use of a variety of sensors or sensor combinations. In one embodiment, an Inertial Measurement Unit (IMU) comprising at least an accelerometer and a gyroscope can be combined with an external positioning system such as GPS, Radio frequency-based localization, Sonar-based localization, etc. In another embodiment simultaneous localization and mapping based on camera, lidar, radar, event-based cameras (SLAM) can be combined with the external positioning systems such as GPS, Radio frequency-based localization, Sonar-based localization, etc. In some embodiments, visual odometry such as camera, lidar, radar, event-based cameras, etc. can also be combined with the external positioning systems such as GPS. Radio frequency-based localization, Sonar-based localization, etc. In some embodiments, the system includes a combination of odometry such as wheel encoders, optical encoders, etc. with the external positioning system such as GPS, Radio frequency-based localization, Sonar-based localization, etc. In some embodiments, an IMU including at least an accelerometer and a gyroscope may be combined with a Barometer. A person with ordinary skill in the art will understand that these combinations are not exhaustive and are simply illustrative examples of sensors and sensor combinations that can be used.

In some embodiments, localization unit 352 uses data to compute a location estimate based on the multi-hypothesis method. Data may include timestampable signals 302, data from one or more sensors 355, or other data. Data related to timestampable signals 302 may include payload, timestamps, signal characteristics (e g, signal strength, peak shape, etc.), or others. This may be achieved by computing an estimate of the position (and, possibly, orientation or motion) of the apparatus 330 based on fusing current values of the data and other information (e.g., knowledge of input history, a dynamic model of the apparatus) according to each of the hypotheses.

Each individually received timestampable signal 302 may be used recursively to provide an updated (posterior) position estimate by merging it with a previous (prior) estimate. This may be performed for each of the hypotheses. In some embodiments, (extended) Kalman Filters, complementary filters, particle filters, Luenberger observers, or any other suitable technique can be used to recursively compute an estimate.

The localization unit 352 may collect several timestampable signal receptions by storing them in memory and batch-processing them (either after receiving a predefined number of signals, or at fixed intervals). Batch-processing methods may be based on multilateration techniques by solving the time difference of arrival (TDOA) measures for the position of the apparatus 330.

In some embodiments, a combination of recursive and batch processing may be used.

A memory unit (not shown in FIG. 3) may be used to store information, such as received timestampable signals 302, for batch processing, the current location estimate, or parameters for the recursive computation (e.g., previous location estimates, previous measurement, previous hypotheses likelihoods, or a combination thereof) and sensor fusion. Localization unit 352 may also use information about received timestampable signals 302 generated by the digital reception electronics 348 (e.g., quality metrics).

Localization unit 352 may here be situated on apparatus 330 because the timestampable signals travelling from the transceivers to the apparatus can contain enough information to allow the apparatus to self-localize. For example, transceivers may be synchronized, and their locations may be known to the apparatus.

The localization system may use approaches like multilateration or trilateration, which result in different sensitivity to measurement noise based on the spatial distribution of transceivers and the location of the apparatus. Localization unit 352 may account for the variation in the quality of information furnished by individual transceivers by accounting for their spatial distribution and correct its estimate of the location as outlined above by accounting for known topologies of the transceivers' or apparatus' relative locations or orientations (e.g., during position calibration and stored in a memory).

In addition, accuracy of estimates computed by localization unit 352 may be significantly improved by sharing information between multiple transmitters or apparatuses. For example, obtaining ranging estimates from more than four transceivers at a self-localizing apparatus results in an over-determined system, which allows the self-localizing apparatus to significantly reduce localization error, e.g., by solving for a least-squares solution. As another example, multiple apparatuses may exchange or pool their data to improve their estimates in specific regions of the space or at specific times during their operation.

Localization unit 352 may provide various outputs (e.g., positions, velocities) in various formats. In some embodiments, it outputs position and heading information in the NMEA 0183 format (a standard format used for GPS receivers).

FIG. 4 is a block diagram of a portion of illustrative system 300 of FIG. 3, which includes a location and orientation update process, in accordance with some embodiments of the present disclosure. Two hypotheses of location and orientation are updated, where the update is realized by means of an extended Kalman filter (EKF). Localization unit 352 may be used with any suitable apparatus 330 of the present disclosure. At the beginning of a cycle, localization unit 352 performs a process update step according to the first hypothesis 420 and a process update step according to the second hypothesis 421, where it uses the previously estimated state of the apparatus and, if available, data from control unit 440 that is indicative of the signal sent to one or more actuators (e.g., actuator 304 of FIG. 5). The results of these steps are a prior estimate according to the first hypothesis 422 and a prior estimate according to the second hypothesis 423. The prior estimates 422 and 423 are for example estimates of the current state of an apparatus 330 that do not take into account any newly taken measurements. The prior estimates 422 and 423 are then fused with available measurements. The prior estimate, measurements, and other data used by the localization unit 352 may be temporarily stored in a memory (not shown in FIG. 4).

A first kind of measurement is the reception of signal 302. Timestamp 406 represents an estimate of when signal 302 reached an apparatus' antenna 332, which may then be fused with the prior estimates 422 and 423 in EKF measurement update steps 424 and 425 according to the respective hypotheses. It will be obvious to a person with ordinary skill in the art that any suitable timestampable signal can be used instead of the aforementioned UWB signal.

As stated above, the resulting timestamp 406 represents an estimate of when signal 302 reached the apparatus' antenna 332. In some embodiments, transmission information is included in the payload of the received UWB signal, which represents when the signal was transmitted and by which transceiver 310. The transmission information, together with the corrected time of arrival, is a measure for the distance between apparatus 330 and the transceiver 310. In localization unit 352, the corrected time of arrival and the transmission information may then be fused with the prior estimates 422 and 423 in measurement update (e.g., EKF measurement update) steps 424 and 425 according to the respective hypotheses.

A second kind of measurement, if new data is available, is from sensor 155. Such measurements may also be fused into the state estimate in EKF measurement update steps 434 and 435 according to the respective hypotheses.

After all types of measurements have been fused into the state estimate, a first posterior estimate 426 according to the first hypothesis and a second posterior estimate 427 according to the second hypothesis are available.

In addition, at each of the measurement update steps 424, 425, 234, and 435, the measurement likelihood for each kind of measurement may be computed. The measurement likelihood may be defined as probability of hypothesis i obtaining a measurement $z_k$ given the measurement history $z_{1:k-1} = [z_1, z_2, \ldots, z_{k-1}]$ and may be written as $$p(z_k | z_{1:k-1}, i)$$

All measurement likelihoods are processed by the likelihood determiner 428 to compute the hypothesis likelihoods 432. For example, the likelihood determiner computes the likelihood of each hypothesis by recursively updating it over time according to $$\tilde{p}(z_{1:k}|i) = p(z_k^{(1)}|z_{1:k-1},i) p(z_k^{(2)}|z_{1:k-1},i) p(z_{1:k-1}|i)$$

where $z_k^{(1)}$ and $z_k^{(2)}$ denote the measurements of first and second kind, respectively, and rescaling as follows such that the sum of all hypothesis likelihoods equals one $$p(z_{1:k}|i) = \frac{\bar{p}(z_{1:k}|i)}{\sum_{i=1}^{2}\bar{p}(z_{1:k}|i)}.$$

The likelihood determiner then forwards the hypothesis likelihoods 432.

The hypothesis selector 429 receives the first posterior estimate 426, the second posterior estimate 427, and the hypothesis likelihoods 432. The hypothesis selector 429 then determines the most appropriate hypothesis (e.g., the most likely hypothesis as defined by $\text{argmax}_i\ p(z_{1:k}|i)$), and in turn decides based on the most appropriate hypothesis which of the two posterior estimates to forward: If the first hypothesis is the most appropriate hypothesis, then the hypothesis selector 429 forwards the first posterior estimate 426. If the second hypothesis is the most appropriate hypothesis, then the hypothesis selector 429 forwards the second posterior estimate 427.

The posterior estimate forwarded by the hypothesis selection 429 contains a location 430 of the apparatus 330 and an orientation 431 of the apparatus 330. Location 430 and orientation 431 may be used by the control unit 440 for feedback control.

FIG. 5 is a block diagram of an illustrative self-localizing apparatus 130 that is capable of actuation in accordance with some embodiments of the present disclosure. In some embodiments, apparatus 330 may be integrated with a mobile robot (e.g., mobile robot 200 of FIG. 2. Control unit 440 computes actuator commands (e.g., for a mobile robot, see FIG. 2).

In one embodiment, at least one sensor is an external motion capturing system such as a camera. The self-localization apparatus 330 has at least one trackable or recognizable feature that is able to be captured by the motion capturing system. The external motion capturing system sends a first data in the external coordinate frame to an evaluation unit, which may or may not be located on the self-localizing apparatus. A second sensor that measures the motion in the internal coordinate frame send a second data to the evaluation unit. The multi-hypotheses process is used to compute the most appropriate orientation hypothesis for the self-localization apparatus.

Technical advantages of certain embodiments of the present disclosure relate to localizing objects in three-dimensional space. Technical advantages of certain embodiments improve the localizing accuracy.

Yet further technical advantages of certain embodiments relate to the reception of wireless signals used, for example, by a device to determine its own location. In some embodiments, the reception of localizing signals does not deteriorate when a direct line of sight cannot be established between a receiving device and a sufficiently large number of signal transmitters. For example, some embodiments allow operation in areas without good line of sight to GNSS satellites and indoors. In some embodiments, signals are not distorted by multipath, do not suffer multipath fading observed in narrowband signals, or do not suffer from reduced signal quality when lacking direct line of sight in indoor environments. For example, some embodiments do not show performance degradation in enclosed environments (e.g., indoors), in forests, or in dense urban environments, such as those where retaining a lock on a GNSS signals becomes more difficult.

Technical advantages of some embodiments are such that they may be used in real-time or may be used by an unlimited number of receivers, to determine their 2D or 3D position, in GPS-denied environments or any environment where greater accuracy or system redundancy may be desired.

Technical advantages of some embodiments may increase performance of current mobile robots and allow new uses of mobile robots by enabling localization with higher update rates, with lower latency, or with higher accuracy than currently possible, resulting in more performant robot control.

Further technical advantages of some embodiments may allow improved system performance by fusing data from several sources including timestampable signals, and onboard motion sensors.

Yet further technical advantages of some embodiments allow for localization without direct line of sight between a transceiver and self-localizing apparatus. Moreover, further technical advantages allow for lower susceptibility to disturbance from radio frequency traffic, secure communications, and increasing resistance to interference, noise, and jamming.

Further technical advantages will be readily apparent to one skilled in the art from the description, drawings, and claims. Moreover, while specific advantages have been enumerated above, various embodiments may include all, some, or none of the enumerated advantages. The listed advantages should not be considered as necessary for any embodiments.

In one embodiment, the present disclosure uses timestampable signals. Timestampable signals are radio frequency (RF) signals, with each signal having a feature that can be detected and that can be timestamped precisely. Examples of features include a signal peak, a signal's leading edge, and a signal preamble. Examples of timestampable signals include RF signals with a distinct, well-defined, and repeatable frequency increase or frequency decrease with time. Further examples of timestampable signals include signal bursts, signal chirps, or signal pulses. Further examples of timestampable signals include signals with features suitable for phase correlation or amplitude correlation techniques (e.g., signals with codes that have low auto-correlation values).

In some embodiments, the timestampable signal are "open-loop", one-directional RF signals transmitted over a reception area. Examples include DCF77 time code signals, GPS P-code signals, and terrestrial trunked radio signals. In some embodiments, the apparatus is a non-emitting apparatus.

In some embodiments, the timestampable signals use a narrow frequency band. In some embodiments, a center or carrier frequency in the ISM band is used. In some embodiments, a center or carrier frequency in the range of 1 to 48 GHz is used. In some embodiments, a center or carrier frequency in the range of 2.4 to 12 GHz is used. In some embodiments, a center or carrier frequency in the range of 3.1 to 10.6 GHz is used. In some embodiments, higher frequencies are used. Narrow band signals tend to suffer from multipath fading more than wide band signals (e.g., ultra-wideband (UWB) signals). In narrow band signals, signal duration is typically longer than the delay variance of the channel. Conversely, with UWB signals the signal duration is typically less than the delay variance of the channel. For example, in the case of an UWB system with a 2 nanosecond pulse duration, the pulse duration is clearly much less than the channel delay variation. Thus, signal components can be readily resolved and UWB signals are robust to multipath fading.

In some embodiments, the timestampable signals are UWB signals. UWB signals are spread over a large bandwidth. As used herein, UWB signals are signals that are spread over a bandwidth that exceeds the lesser of 125 MHz or 5% of the arithmetic center frequency. In some embodiments, UWB signals are signals that are spread over a bandwidth that exceeds the lesser of 250 MHz or 10% of the arithmetic center frequency. In some embodiments, UWB signals are signals that are spread over a bandwidth that exceeds the lesser of 375 MHz or 15% of the arithmetic center frequency. In some embodiments, UWB signals are signals that are spread over a bandwidth that exceeds the lesser of 500 MHz or 20% of the arithmetic center frequency. In some embodiments, a bandwidth in the range of 400-1200 MHz is used. In some embodiments, a bandwidth in the range of 10-5000 MHz is used. In some embodiments, a bandwidth in the range of 50-2000 MHz is used. In some embodiments, a bandwidth in the range of 80-1000 MHz is used. Ultra-wideband technology allows an initial radio frequency (RF) signal to be spread in the frequency domain, resulting in a signal with a wider bandwidth, ordinarily wider than the frequency content of the initial signal. UWB technology may be suitable for use in a localization system because it can transmit very short-duration pulses that may be used to measure the signal's arrival time very accurately and hence allow ranging applications. UWB signals may be advantageous for use in localization systems because of their capability to penetrate obstacles and to allow ranging for hundreds of meters while not interfering with conventional narrowband and carrier waves used in the same frequency bands.

In some embodiments, the timestampable signals are Wi-Fi signals as defined by the IEEE 802.11 standard. In some embodiments, the timestampable signals are signals complying with the IEEE 802.15 standard. In some embodiments, the timestampable signals are time-stamped according to the fine timing measurement (FTM) protocol. In some embodiments, the timestampable signals are spread over a bandwidth of 20, 40, 80, or 160 MHz, for example. In some embodiments, measurements of the carrier phase of the timestampable signals are taken and used to explicitly or implicitly refine or correct the measured arrival time of the timestampable signals. In some embodiments, measurements of the carrier phase of the timestampable signals are taken and used in combination with the measured arrival time of the timestampable signals to determine the location of the self-localizing apparatus.

Some embodiments include a localization unit. In some embodiments, the localization unit can compute at least one of (i) an orientation or orientation information, (ii) a position, or (iii) a motion of the self-localizing apparatus.

In some embodiments, the localization unit computes the location of the self-localizing apparatus based on the reception times of the timestampable signals and the known locations of the transceivers. In some embodiments, a time of arrival scheme is used. In some embodiments, a time difference of arrival scheme is used. Multilateration requires the localization unit to compute the time-difference between the reception times of two timestampable signals. By subtracting the known time-difference of the signals' transmission times from the difference in their reception times (also referred to as a "TDOA measurement"), a localization unit may compute the difference in distance to the two transceivers, from which the signals were transmitted (e.g., transceiver two is 30 cm further away than transceiver one, since the reception of the signal from transceiver two was delayed by 1 ns in comparison to the signal from transceiver one). By computing the difference in distance between multiple transceivers, the localization unit may be able to compute the location of the self-localizing apparatus by solving a system of hyperbolic equations, or a linearized version thereof. Methods of solving this system of equations are well known to those skilled in the art and may include non-linear least squares, least squares, Newton iterations, gradient descent, etc. The method of multilateration requires the time-difference of the signals' transmission times to be known.

In some embodiments, the localization unit of the self-localizing apparatus may compute location iteratively. In some embodiments, rather than waiting for the timestampable signal to be received from all transceivers, the localization unit iteratively updates the location estimate whenever a timestampable signal is received. In some embodiments, when a timestampable signal is received, an adjustment to the current location estimate is computed in dependence of the difference between its reception time and the reception time of a previously received timestampable signal. In some embodiments, a known method of filtering (e.g., Kalman filtering, particle filtering) is used to compute or apply this update. In some embodiments, the adjustment is computed based on the variance of the current location estimate (e.g., if the current estimate is highly accurate, less adjustment will be applied). In some embodiments, the adjustment is computed based on the locations of the two transceivers from which the timestampable signals were transmitted. In some embodiments, this adjustment is computed based on a measurement model, describing the probability distribution of a TDOA measurement based on the current location estimate and the locations of the two transceivers. In some embodiments, this enables adjustment to be applied depending on how accurate the TDOA measurement is determined to be (e.g., if a first transceiver lies on a line connecting the current location estimate with a second transceiver, the TDOA measurement resulting from the two transceivers may be considered unreliable, and thus less adjustment applied).

In some embodiments, the localization unit updates a location estimate based on a system model, describing the probability distribution of the self-localizing apparatus' location. In some embodiments, this system model may be based on other estimated states (e.g., the velocity or heading of the self-localizing apparatus). In some embodiments, this system model may be based on input history (e.g., if an input command should yield a motion in the positive x-direction according to system dynamics, it is more probable the new location estimate lies in the positive x-direction, than in the negative x-direction).

In some embodiments, the localization unit may use a history of location estimates and a system model to compute, in addition to location, further dynamic states of the body, for example, velocity. For example, if the history of location estimates indicates motion, velocity can be estimated. A further example is if the history of location estimates indicates motion in the positive y-direction, and the system model indicates that only forward motion is possible (e.g., a skid-steer car), the orientation can be determined as oriented in the positive v-direction. In some embodiments, the location is a 1D location, a 2D location, a 3D location, or a 6D location (e.g., including position and orientation).

A clock as used herein refers to circuitry, structure, or a device that is capable of providing a measure of time. The measure of time may be in any suitable units of time. For example, the measure of time may be based on a base unit of a second. As another example, the measure of time may be based on a counter that increments at a particular rate. In some embodiments, the clock comprises an internal oscillator used to determine the measure of time. In some embodiments, the clock determines the measure of time based on a received signal (e.g., from an external oscillator).

In some embodiments, each transceiver may use its own onboard clock. In some embodiments, a single clock may generate a clock signal transmitted to each transceiver via cables or wirelessly. In some embodiments, the clock signal may be dependent on at least one-time code transmitted by a radio transmitter, or on at least one of a terrestrial radio clock signal, a GPS clock signal, and a time standard. In some embodiments, the clock signal may be based on a GPS-disciplined oscillator, on a transmitter, or on a time estimate computed from at least two clocks to improve accuracy or long-term stability of the clock signal.

Clocks may, for example, use a crystal oscillator or a temperature compensated crystal. In some embodiments, enhanced clock accuracy may be obtained through temperature stabilization via a crystal oven (OCXO) or via analog (TCXO) compensation or via digital/micro-controller (MCXO) compensation. In some embodiments, a centralized synchronization unit is used. In some embodiments, an atomic oscillator (e.g., rubidium) is used as a clock. In some embodiments, a MEMS oscillator is used as a clock. In some embodiments, a clock is structured and arranged to have an Allan variance of at most $(1\times10^{-6})^2$ or $(1\times10^{-8})^2$ or $(5\times10^{-10})^2$ for averaging intervals between 5 milliseconds and 10 milliseconds or for averaging intervals between 5 milliseconds and 100 milliseconds or for averaging intervals between 1 millisecond and 1 second.

The apparatus or transceiver may be equipped with analog and digital reception electronics. The reception electronics may amplify the received signal and convert it to a base signal, which may then be demodulated and passed on to a central processing electronics. An important design aspect of the receiver is to minimize noise and distortion. This may be achieved by carefully selecting reception electronics' components (especially those of the amplifier) and by optimizing the receiver's circuit design accordingly.

The apparatus or transceiver may be equipped with analog and digital transmission electronics. In some embodiments, transceivers coordinate their transmissions at the packet level. In some embodiments, packet emission overlap is avoided. In some embodiments, packets are emitted in a round-robin fashion; at regular intervals; in a specific time-sequence; or taking turns. In some embodiments, transceivers transmit packets simultaneously.

In some embodiments, micro-electro-mechanical systems (MEMS) or piezoelectric systems may be used to allow achieving operating characteristics outlined in the present disclosure. Examples of such micro-sensors that can be usefully employed with the present disclosure include MEMS gyroscopes, MEMS accelerometers, piezoelectric gyroscopes, and piezoelectric accelerometers. In some embodiments, the use of micro-sensors allows using one or more inertial measurement units (IMUs), which may each combine multiple gyroscopes or accelerometers or use multiple-axis gyroscopes or accelerometers, in each subsystem. In some embodiments, such selection of micro-sensors allows creating or using a self-localizing apparatus suitable for highly dynamic movement that require low weight and low power consumption in spite of high performance. For example, a 3-axis M EMS gyroscope may be used to monitor a self-localizing apparatus' attitude and to allow triggering a signal if an attitude threshold is exceeded. As another example, a MEMS gyroscope may be used to control a small flying robot equipped with a self-localizing apparatus around hover in spite of its low time constant. Examples of optical sensors include infrared sensors, linear cameras, optic flow sensors, and imaging sensors, among others.

A control unit is used to generate control signals for actuators in dependence of data received from a localization unit (e g, a position estimate) or of sensors (e.g, an onboard sensor). The control unit can implement any suitable control laws, techniques, and processes. For example, the control unit may implement PID control, model predictive control, sliding mode control, full state feedback, backstepping control, any other suitable control technique, or any combination thereof. In a further example, depending on the control technique, the control unit may use state estimates provided by a localization unit.

In some embodiments, a control unit may compute control signals for a single actuator. In some embodiments, a control unit computes different sets of control signals for different sets of actuators. For example, a control unit may compute a first set of control signals for two actuators of a first module or axis of a robot and a second set of control signals for a second module or axis of a robot. Actuators may belong to the group of electric, magnetic, and mechanical motors moving or controlling a mechanism or system. Illustrative examples include a piezoelectric actuator, a brushless electric motor, and a servo motor.

In some embodiments, an actuator is configured to move the corresponding apparatus in its three translational degrees of freedom. In some embodiments, the actuator is configured to move the apparatus in its three rotational degrees of freedom. In some embodiments, the actuator is structured and arranged to move a part of the apparatus (e.g., such as the antenna or an effector). In some embodiments, multiple actuators are used in conjunction to affect motion.

Figure 6:
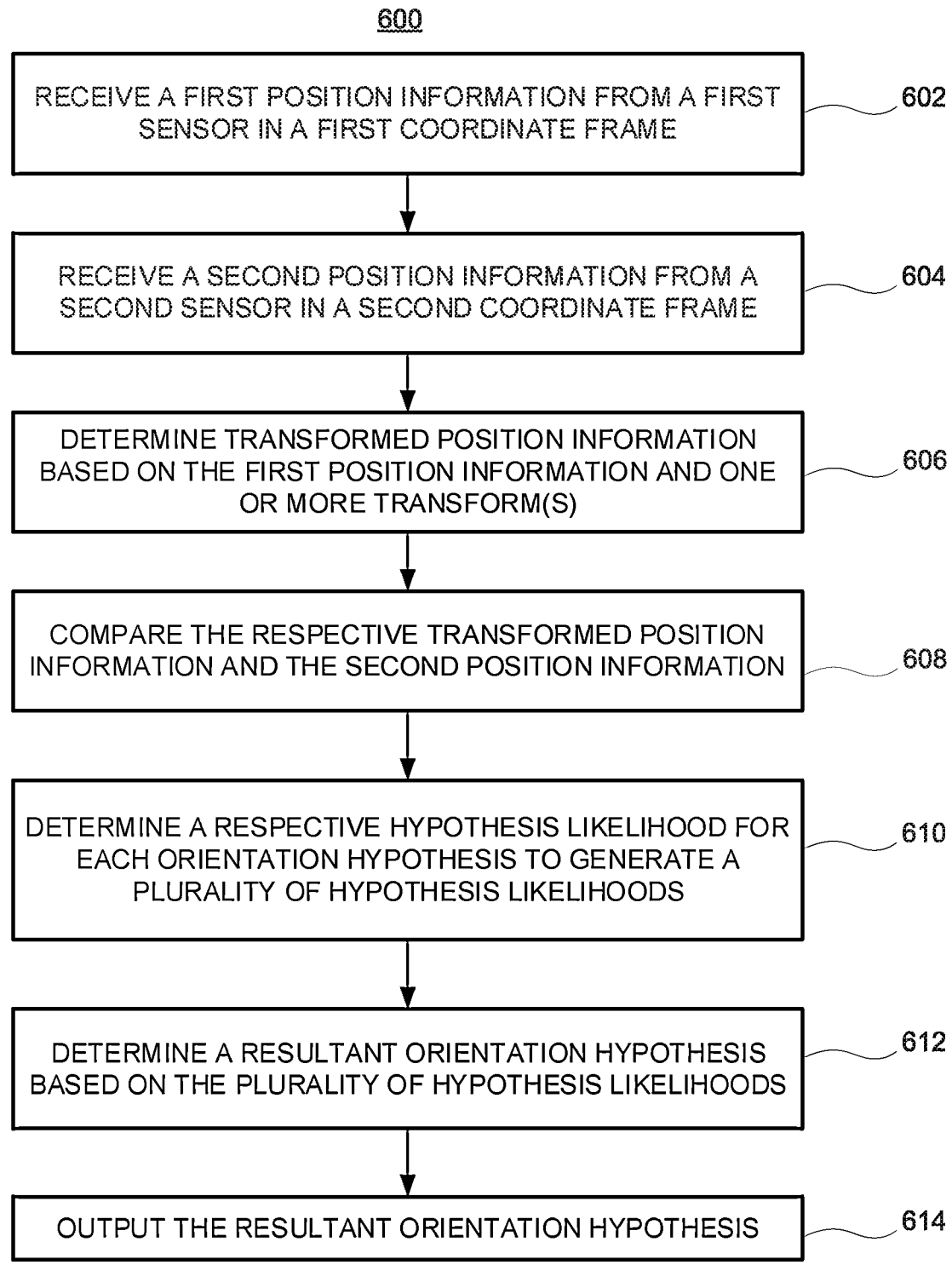
FIG. 6 is a flowchart for an illustrative process for estimating an orientation, in accordance with some embodiments of the present disclosure.
Figure 7:
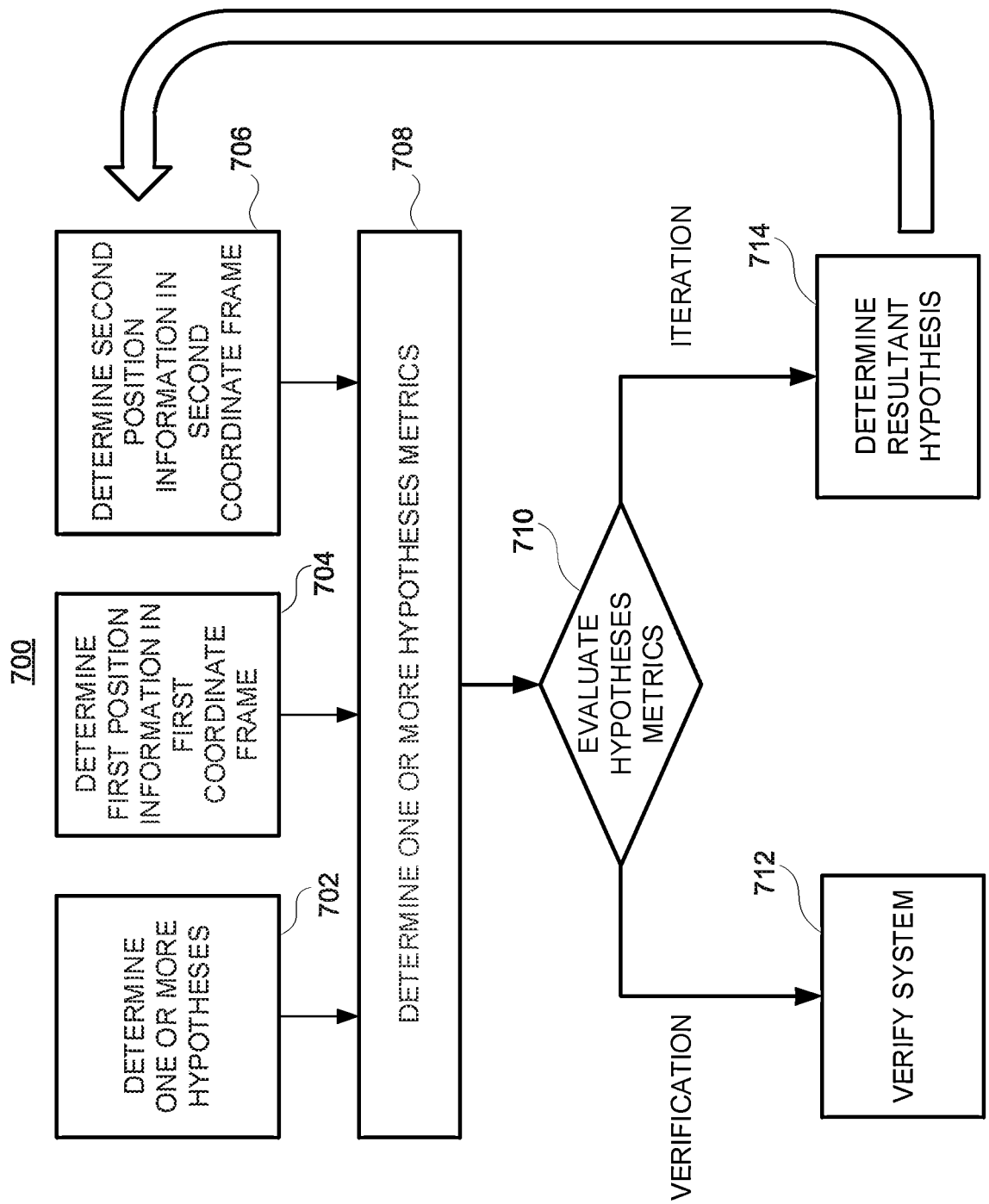
FIG. 7 is a flowchart for an illustrative process for managing an orientation, in accordance with some embodiments of the present disclosure.

FIGS. 6-7 illustrate illustrative processes for estimating orientation information. Processes 600 and 700 of FIGS. 6-7 may be performed by any suitable control circuitry, applications implemented thereon, or any combination thereof.

FIG. 6 is a flowchart for illustrative process 600 for estimating an orientation of an object, in accordance with some embodiments of the present disclosure.

At step 602, the control circuitry receives first position information from a first sensor in a first coordinate frame. In some embodiments, the first coordinate frame is an internal coordinate frame (e.g., relative to the object). In some embodiments, the first sensor includes one or more accelerometers (e.g., providing signals for acceleration along 1, 2, or 3 axes), one or more gyroscopes (e.g, providing signals for angular velocity about 1, 2, or 3 axes), any other suitable sensor for sensing motion, or any combination thereof. For example, an object may include a 3-axis accelerometer and a 3-axis gyroscope, and accordingly the control circuitry may receive six signals from the sensors.

Position information may include, for example, a position (e g, a position vector, a scalar position, a position relative to one or more references, or a component thereof), a velocity (e.g., a velocity vector, a scalar speed, a velocity relative to one or more references, or a component thereof), an acceleration (e.g., an acceleration vector, a scalar acceleration, an acceleration relative to one or more references, or a component thereof), an orientation (e.g., an orientation vector, a scalar orientation angle, an orientation relative to one or more references, or a component thereof), an angular velocity (e.g., an angular velocity vector, a scalar angular speed, an angular velocity relative to one or more references, or a component thereof), an angular acceleration (e.g., an angular acceleration vector, a scalar angular acceleration, an angular acceleration relative to one or more references, or a component thereof), or a combination thereof. Further position information may include information proportional to, or otherwise related to position information such as, for example, linear momentum, angular momentum, force, or a combination thereof.

At step 604, the control circuitry receives second position information from a second sensor in a second coordinate frame. The second coordinate frame is different than the first coordinate frame. In some embodiments, the second coordinate frame is an external coordinate frame (e.g., relative to the ground or other stationary reference). In some embodiments, the second sensor includes a GPS-based sensing system that may be arranged as part of the object. For example, an object may include a GPS receiver that communicates with a plurality of GPS satellites, and accordingly the control circuitry may determine a position of the object in the external coordinate frame. The control circuitry may, but need not, receive the second position information at the same time and same sampling rate as the first position information. For example, the first sensor may be relatively high bandwidth (e.g., with a fast sampling rate), and the second sensor may be relatively low bandwidth (e.g, with a slower sampling or refresh rate). In a further example, the second position information need not be received at regular intervals. For example, the second position information may be intermittent, or otherwise have irregular reception times.

At step 606, the control circuitry determines, for each hypothesis, transformed position information based on the first position information and one or more transforms. In some embodiments, each transform corresponds to a respective hypothesis. For example, there may be N hypotheses (e.g., N hypothetical orientations), and each may have an associated transform, thus resulting in N transforms, which are used to generate N sets of transformed position information. In an illustrative example, for three hypotheses, a set of position values (e.g., of first position information) may be transformed to three sets of transformed position values by three respective transforms, each transform corresponding to a respective hypothesis. In a further illustrative example, for bearing-based hypotheses of North, East, South, and West, the control circuitry may determine four sets of transformed position information oriented at 90° intervals in a suitable bearing plane (e.g., the horizontal plane at a position).

At step 608, the control circuitry compares each transformed position information to the second position information. In some embodiments, the control circuitry generates an error vector or scalar error value indicative of how well the transformed position information agrees with the second position information. For example, if a particular hypothesis were relatively accurate, then the transformed position information associated with that hypothesis is expected to agree with the second position information relatively closely. Accordingly, hypotheses that are less accurate are expected to be in less agreement with the second position information.

At step 610, the control circuitry determines a respective hypothesis likelihood for each orientation hypothesis to generate a plurality of hypothesis likelihoods. In some embodiments, the control circuitry determines the hypothesis likelihoods based on the comparison(s) of step 608. For example, the control circuitry may determine a probability density function (pdf) based on current and historical position information, and determine the hypothesis likelihood based on the pdf. The control circuitry may normalize, filter, or otherwise process the hypothesis likelihoods to generate hypotheses metrics. In some embodiments, the hypothesis likelihoods are hypotheses metrics. In some embodiments, each hypothesis likelihood is determined based on the respective measurement likelihood.

At step 612, the control circuitry determines a resultant orientation hypothesis based on the plurality of hypothesis likelihoods. In some embodiments, the control circuitry may select the hypothesis associated with a maximum hypothesis likelihood. For example, in circumstances where the span of hypotheses is small relative to the number of hypotheses, the control circuitry may select the most likely hypothesis. In some embodiments, the control circuitry may estimate a hypothesis by determining a weighted average or weighted sum of hypothesis likelihoods. For example, for hypotheses North and West, if each has an associated likelihood of 0.5, then the resultant orientation may be NorthWest. The resultant orientation may be, but need not be, equal to any of the hypotheses.

At step 614, the control circuitry outputs the resultant orientation hypothesis. The resultant hypothesis may be, for example, stored in memory, outputted to a control unit (e.g., control unit 440) for determining actuator commands, transmitted to a remote device (e.g., located on the ground or at a different location), transmitted to another object (e.g., another robot), outputted for display on a display screen of a user device, outputted to a software module, outputted in any other suitable way, or any combination thereof.

The control circuitry, in performing process 600, may use any suitable number of hypotheses to determine any suitable number of transformed position information instances. Further, the control circuitry may update the number of hypotheses, the span of the hypotheses, or both to determine the orientation more precisely. For example, at initialization, the control circuitry may use four hypotheses such as N, E, S, and W (e.g., spanning 360°). After several iterations, the control circuitry may narrow the span to N and E, and accordingly include four updated hypotheses such as N, NNE, NE, and E (e g, spanning 90°). After several more iterations, the control circuitry may narrow the span to N and NNE, and accordingly include four updated hypotheses such as bearings 0°, 7.5°, 15°, 22.5° (e.g., spanning 22.5°). In some embodiments, as the object moves and its orientation changes, the control circuitry may continually update the set of hypotheses. In some embodiments, as the object moves and its orientation changes, the control circuitry maintains the set of hypotheses, and updates the likelihood of each orientation in time. For example, the control circuitry may use eight hypotheses (e.g., N, NE, E, SE, S, SW, W, and NW) for all iterations, and determine a resultant hypothesis (e.g., a bearing of 35°) based on a weighted sum of likelihoods associated with the hypotheses.

FIG. 7 is a flowchart for illustrative process 700 for managing an orientation, in accordance with some embodiments of the present disclosure.

At step 702, the control circuitry determines one or more hypotheses. In some embodiments, the one or more hypotheses are predetermined. For example, the control circuitry may always use the same set of hypotheses for analysis. In some embodiments, the one or more hypotheses are determined based on a previous instance of process 700. For example, the control circuitry may use the output of steps 712, 714, or a combination thereof to determine the set of hypotheses. In some embodiments, the control circuitry may determine one or more hypotheses for one or more orientations. For example, the control circuitry may determine four hypotheses for a bearing, three hypotheses for pitch, and three hypotheses for roll (e.g., resulting in 10 hypotheses), or all combinations thereof (e.g., resulting in 36 hypotheses). In some embodiments, the hypotheses may include a combination of orientations. For example, a hypothesis may include a 3-component hypothesis, having an assumed orientation in each of the three rotational degrees of freedom.

At step 704, the control circuitry receives first position information from a first sensor in a first coordinate frame. In some embodiments, the first coordinate frame is an internal coordinate frame (e.g., relative to the object). In some embodiments, the first sensor includes one or more accelerometers (e.g., providing signals for acceleration along 1, 2, or 3 axes), one or more gyroscopes (e.g., providing signals for angular velocity about 1, 2, or 3 axes), any other suitable sensor for sensing motion, or any combination thereof. For example, an object may include a 3-axis accelerometer and a 3-axis gyroscope, and accordingly the control circuitry may receive six signals from the sensors.

At step 706, the control circuitry receives second position information from a second sensor in a second coordinate frame. The second coordinate frame is different than the first coordinate frame. In some embodiments, the second coordinate frame is an external coordinate frame (e.g., relative to the ground or other stationary reference). In some embodiments, the second sensor includes a GPS-based sensing system that may be arranged as part of the object. For example, an object may include a GPS receiver that communicates with a plurality of GPS satellites, and accordingly the control circuitry may determine a position of the object in the external coordinate frame. The control circuitry may, but need not, receive the second position information at the same time and same sampling rate as the first position information. For example, the first sensor may be relatively high bandwidth (e.g., with a fast sampling rate), and the second sensor may be relatively low bandwidth (e.g., with a slower sampling or refresh rate). In a further example, the second position information need not be received at regular intervals. For example, the second position information may be intermittent, or otherwise have irregular reception times. In a further example, an object may be positioned indoors or otherwise in a confined volume and UWB or WiFi localization may be used.

At step 708, the control circuitry determines a respective hypothesis metric for each orientation hypothesis to generate a plurality of hypothesis metrics (e.g., measurement likelihoods). In some embodiments, at step 808, the control circuitry determines the measurement likelihoods based on the comparison(s) of position information of steps 704 and 706. For example, the control circuitry may determine a probability density function (pdf) based on current and historical position information, and determine the measurement likelihood based on the pdf. The control circuitry may normalize, filter, or otherwise process the measurement likelihoods to generate hypotheses metrics. In some embodiments, the measurement likelihoods are hypotheses metrics.

At step 710, the control circuitry evaluates the one or more hypothesis metrics determined at step 708. Based on the hypothesis metrics, histories or trends thereof, or both, the control circuitry may proceed to any or all of steps 712 and 714.

At step 712, the control circuitry verifies the system. In some embodiments, one or more sensors or other components, the system, or both are verified. For example, if the first position information agrees sufficiently well with the second position information, the control circuitry may determine that the system is operating as intended and expected (e.g., the system is verified). As another example, if the first position information does not agree sufficiently well with the second position information, the control circuitry may determine that the system is not operating as intended or expected (e.g., the system is not verified). In some embodiments, the control circuitry may perform verification of one or more of the system computations. For example, verification can be performed for one or more of each hypothesis, a resultant hypothesis, a hypothesis corresponding to an orientation in a particular degree of freedom, a measurement, an algorithm or setting/parameter thereof, or a combination thereof. In some embodiments, verification includes determining whether a fault has occurred. A fault may include, for example, a sensor failure, a communications failure, significant signal noise, a resultant hypothesis that is unexpected or otherwise has a low confidence associated, a calculation error (e.g., due to numerical methods, algorithms, or other processing), sufficiently low measurement and/or hypothesis likelihood for all hypotheses, any other suitable fault condition, or any combination thereof. In some embodiments, the control circuitry may return to steps 702, 704, and 706 after performing step 712. For example, if at step 712 the control circuitry determines a fault has occurred, the control circuitry may re-initialize the hypotheses at step 702 (e.g., reset the hypotheses values to predetermined values) and repeat steps of process 700.

At step 714, the control circuitry determines a resultant orientation hypothesis based on the plurality of measurement likelihoods. In some embodiments, the control circuitry may select the hypothesis associated with a maximum measurement likelihood. For example, in circumstances where the span of hypotheses is small relative to the number of hypotheses, the control circuitry may select the most likely hypothesis. In some embodiments, the control circuitry may estimate a hypothesis by determining a weighted average or weighted sum of measurement likelihoods. For example, for hypotheses North and West, if each has an associated likelihood of 0.5, then the resultant orientation may be NorthWest. The resultant orientation may be, but need not be, equal to any of the hypotheses. In some embodiments, the control circuitry may return to steps 702, 704, and 706 after performing step 714.

In some embodiments, the sensor or system providing the partial orientation information is verified by comparing the partial orientation information with at least one of the one or more orientation hypotheses, the resultant orientation hypothesis, or the output orientation information. For example, in some embodiments, a fault in a magnetometer (e.g. caused by magnetic interference) can be detected by receiving partial orientation information from the magnetometer and comparing the partial orientation information with at least one of the one or more orientation hypotheses, the resultant orientation hypothesis, or the output orientation information. For example, if the partial orientation information and the resultant orientation hypothesis are sufficiently different (e.g. by more than 15, 30, 45, or 90 degrees) a fault in the magnetometer is detected.

In both processes 600 and 700 of FIGS. 6-7, the first position and second position information may be transformed to either the first coordinate frame or the second coordinate frame. For example, a sensor may include an accelerometer, and the determined acceleration from the sensor may be integrated once in time to determine velocity, or twice in time to determine position. In an illustrative example for an autonomous robot, the robot may start in a location with an expected orientation, and processes 600 and 700 may be used to verify the orientation, or to determine if an orientation inconsistency arises. If orientated incorrectly, processes 600 and 700 will identify the incorrect orientation and correct for it. In a further illustrative example, a robot may include a magnetometer and may be operating in regions with high interference (e.g., near power lines), thus corrupting some transmitted data (e.g., a measurement). Processes 600 and 700 will allow the robot to rely on other sensors (e.g., an IMU) to accurately determine its orientation.

While certain aspects of the present invention have been particularly shown and described with reference to exemplary embodiments thereof, it will be understood by those of ordinary skill in the art that various changes in form and details may be made therein without departing from the spirit and scope of the present invention as defined by the following claims. It will also be understood that the transceivers, apparatus, and components of the present disclosure may comprise hardware components or a combination of hardware and software components. The hardware components may comprise any suitable tangible components that are structured or arranged to operate as described herein. Some of the hardware components may comprise processing circuitry (e.g., a processor or a group of processors) to perform the operations described herein. The software components may comprise code recorded on tangible computer-readable medium. The processing circuitry may be configured by the software components to perform the described operations. It is therefore desired that the present embodiments be considered in all respects as illustrative and not restrictive.

What is claimed is:

1. A system comprising:
   a first sensor configured to sense a first position information of an object in an internal coordinate frame;
   control circuitry coupled to the first sensor, and configured to:
      receive the first position information from the first sensor, wherein the first position information is expressed in the internal coordinate frame;
      receive a second position information from a second sensor, wherein the second sensor is configured to sense the second position information of the object in an external coordinate frame, and wherein the second position information is expressed in the external coordinate frame;
      for each orientation hypothesis of a plurality of orientation hypotheses:
         determine based on the respective orientation hypothesis the first position information in a common coordinate frame and the second position information in the common coordinate frame;
         compare the respective first position information in the common coordinate frame and the second position information in the common coordinate frame; and
         determine a hypothesis likelihood for the respective orientation hypothesis to generate a plurality of hypothesis likelihoods for the plurality of orientation hypotheses; and
      determine a control signal to be applied to an actuator to affect control on the motion of the object based on the plurality of hypothesis likelihoods.

2. The system of claim 1, wherein a resultant orientation hypothesis is determined based on the plurality of hypothesis likelihoods.

3. The system of claim 2, wherein the control circuitry is further configured to determine the resultant orientation hypothesis by selecting a maximum likelihood among the plurality of hypothesis likelihoods.

4. The system of claim 2, wherein the control circuitry is further configured to determine the resultant orientation hypothesis by determining a weighted average of the plurality of orientation hypotheses, wherein the weighted average is based on a plurality of weightings, and wherein the plurality of weightings are based on the plurality of hypothesis likelihoods.

5. The system of claim 2, wherein an output orientation information is based on the resultant orientation hypothesis.

6. The system of claim 5, wherein the control circuitry is configured to determine the control signal based on the plurality of hypothesis likelihoods by determining the control signal based on the output orientation information.

7. The system of claim 5, wherein the control circuitry is further configured to receive information representative of at least part of an orientation of the object, and to compare said information with the output orientation information.

8. The system of claim 5, wherein the control circuitry is further configured to receive information representative of at least part of an orientation of the object, and to compare said information with the resultant orientation hypothesis.

9. The system of claim 1, wherein the first sensor comprises at least one of the group comprising at least one accelerometer and at least one gyroscope.

10. The system of claim 1, wherein the second sensor comprises at least one of the group comprising a localization system and a motion capturing system.

11. The system of claim 1, wherein the first position information comprises an acceleration of the object.

12. The system of claim 1, wherein the first position information comprises a position of the object.

13. The system of claim 1, wherein the first position information comprises an angular velocity of the object.

14. The system of claim 1, further comprising an Inertial Measurement Unit (IMU) comprising the first sensor, wherein the first sensor comprises at least an accelerometer and a gyroscope, and wherein the second sensor comprises a positioning system.

15. The system of claim 1, wherein the first sensor comprises a system configured for simultaneous localization and mapping (SLAM).

16. The system of claim 1, further comprising an odometry system comprising the first sensor, wherein the second sensor comprises a positioning system.

17. The system of claim 16, wherein the odometry system comprises a visual odometry system.

18. A method comprising:
   receiving a first position information of an object from a first sensor, wherein the first position information is expressed in an internal coordinate frame;
   receiving a second position information of the object from a second sensor, wherein the second position information is expressed in an external coordinate frame;
   for each orientation hypothesis of a plurality of orientation hypotheses:
      determining based on the respective orientation hypothesis the first position information in a common coordinate frame and the second position information in a common coordinate frame;

comparing the respective first position information in the common coordinate frame and the second position information in the common coordinate frame; and determining a hypothesis likelihood for the respective orientation hypothesis to generate a plurality of hypothesis likelihoods for the plurality of orientation hypotheses; and determining a control signal to be applied to an actuator to affect control on the motion of the object based on the plurality of hypothesis likelihoods.

19. The method of claim 18, wherein a resultant orientation hypothesis is determined based on the plurality of hypothesis likelihoods.

20. The method of claim 19, further comprising determining the resultant orientation hypothesis by selecting a maximum likelihood among the plurality of hypothesis likelihoods.

21. The method of claim 19, further comprising determining the resultant orientation hypothesis by determining a weighted average of the plurality of orientation hypotheses, wherein the weighted average is based on a plurality of weightings, and wherein the plurality of weightings are based on the plurality of hypothesis likelihoods.

22. The method of claim 19, wherein an output orientation information is based on the resultant orientation hypothesis.

23. The method of claim 22, wherein determining the control signal based on the plurality of hypothesis likelihoods comprises determining the control signal based on the output orientation information.

24. The method of claim 18, wherein the first position information comprises a position of the object.

25. The method of claim 18, wherein the first position information comprises an angular velocity of the object.

26. The method of claim 18, wherein the first position information comprises an acceleration of the object.

27. A mobile robot comprising:
a first sensor configured to sense a first position information of an object in an internal coordinate frame;
an actuator that can affect motion of the robot; and
control circuitry coupled to the first sensor and the actuator, and configured to:
receive the first position information from the first sensor, wherein the first position information is expressed in the internal coordinate frame;
receive a second position information from a second sensor, wherein the second sensor is configured to sense the second position information of the object in an external coordinate frame, and wherein the second position information is expressed in the external coordinate frame;
for each orientation hypothesis of a plurality of orientation hypotheses:
determine based on the respective orientation hypothesis the first position information in a common coordinate frame and the second position information in the common coordinate frame;
compare the respective first position information in the common coordinate frame and the second position information in the common coordinate frame; and
determine a hypothesis likelihood for the respective orientation hypothesis to generate a plurality of hypothesis likelihoods for the plurality of orientation hypotheses; and
apply a control signal to the actuator to affect the motion of the robot based on the plurality of hypothesis likelihoods.

28. The mobile robot of claim 27, wherein a resultant orientation hypothesis is determined based on the plurality of hypothesis likelihoods.

29. The mobile robot of claim 28, wherein an output orientation information is based on the resultant orientation hypothesis.

* * * * *